United States Patent [19]
Ong et al.

[11] Patent Number: 5,448,956
[45] Date of Patent: Sep. 12, 1995

[54] ONE-WAY LIGHTWEIGHT PALLET

[75] Inventors: Alex Ong, Fitzroy; Ross Chiodo; John Mammoliti, both of Reservoir all of Australia

[73] Assignee: Visy Board Properties Pty. Ltd., Reservoir, Australia

[21] Appl. No.: 969,041

[22] Filed: Oct. 30, 1992

Related U.S. Application Data

[63] Continuation-in-part of Ser. No. 838,518, Feb. 19, 1992, abandoned.

[30] Foreign Application Priority Data

Feb. 22, 1991 [AU] Australia ............... PK4761

[51] Int. Cl.⁶ ............................................. B65D 19/00
[52] U.S. Cl. ................................... 108/51.3; 108/52.1
[58] Field of Search ............ 108/51.1, 51.3, 52.1

[56] References Cited

U.S. PATENT DOCUMENTS

| | | |
|---|---|---|
| 2,432,295 | 12/1947 | Donahue . |
| 2,493,562 | 1/1950 | Yarman ............... 108/51.3 |
| 2,583,443 | 1/1952 | Perry et al. ............ 108/51.3 |
| 2,673,022 | 3/1954 | Prossen ............... 108/51.3 |
| 5,111,754 | 5/1992 | Adams, Jr. . |

FOREIGN PATENT DOCUMENTS

| | | | |
|---|---|---|---|
| 569513 | 1/1959 | Canada . | |
| 0494540 | 7/1992 | European Pat. Off. ........... 108/51.3 |
| 36838 | 2/1923 | Norway ................. 108/51 |
| 92/012061 | 7/1992 | WIPO ................. 108/51.3 |

Primary Examiner—Kenneth J. Dorner
Assistant Examiner—Gerald A. Anderson
Attorney, Agent, or Firm—Foley & Lardner

[57] ABSTRACT

A pallet comprising a flat top member (1) having depending sides (2, 3, 4, 5,) and a base member comprising eight generally triangular elements (6 to 13, 30 to 33, 40 to 47) each formed from closely packed elements of single-face corrugated paperboard in which the corrugations are perpendicular to the top member (1), and forklift openings (14 to 29) formed in the edges of the base elements. In another form the pallet is formed from a single winding of single-face corrugated paperboard to define a central square opening 52, a pair of opposed generally triangular openings 53, 54, a pair of opposed truncated triangular openings 55, 56 at 90° to the triangular openings 53, 54, a further pair of larger truncated triangular openings 57, 58 located at 45° to the preceding pair, a further pair of slightly larger truncated triangular openings 59, 60 at 90° to the preceding pair, two further opposed pairs of larger triangular openings 61, 62, 63, 64 at 45° to each of the preceding openings 59, 60, and triangular opening 65, 66, 67 and 68 at the corners of the pallet defined by a square peripheral element 51 of the wound corrugated board, the foregoing openings defining load bearing beam members which intersect the direction of support of the pallet by the forks of the fork lift truck which are inserted between feet 69, 70 and 71 adhesively secured to the pallet body. Being made from corrugated board, the pallet is lighter and cheaper than wooden pallets and may be easily recycled.

22 Claims, 5 Drawing Sheets

ONE-WAY LIGHTWEIGHT PALLET

REFERENCE TO RELATED APPLICATION

This application is a continuation-in-part of U.S. patent application Ser. No. 07/838,518 filed Feb. 19, 1992, now abandoned.

FIELD OF THE INVENTION

This invention relates to improvements in pallets.

BACKGROUND OF THE INVENTION

Pallets are widely used in the transportation and storage of goods and are most commonly manufactured from wooden slats secured to the opposite sides of wooden spacers to create fork lift access openings. Wooden pallets are often hired by the user, but because of their capital cost, they should be returned for reuse. This additional transportation cost serves to exacerbate the hiring or capital cost of the pallets. Although one-way wooden pallets of low quality material are available, their cost is still relatively prohibitive and the environmental consequences of such use of wood is becoming increasingly unpopular.

In the past, many attempts have been made to create a one-way pallet of material other than wood, and while the capital cost is reduced by fabricating a pallet from folded corrugated board blanks or from moulded waste paper pulp, such pallets have not thus far been able to carry an adequate load or are not sufficiently less expensive than one-way wooden pallets.

A typical example of a pallet proposed to be manufactured from corrugated paperboard is found in U.S. Pat. No. 2,432,295 Donahue, which described a pallet made from corrugated board comprising spaced base and platform members each formed from sheets of board between which elements of adhesively bonded corrugated board are sandwiched with the corrugations on edge. The base and platform members are held in spaced relation by spacer blocks which may be formed from tightly wound corrugated board members on edge. The main shortcoming of this proposal is that the formation of the base and platform members is labour intensive and therefore expensive, and unless the corrugated board elements are carefully assembled and maintained on edge, the reinforcing effectiveness of the corrugated board elements may be seriously compromised.

SUMMARY OF INVENTION AND OBJECT

It is an object of the present invention to provide a one-way lightweight pallet which is able to support adequate loads.

The invention therefore provides a pallet comprising a pallet body having an upper load supporting face and a lower face, said pallet body being formed from corrugated paperboard tightly wound in multiple thicknesses which are in intimate contact with each other with the corrugations of the multiple thicknesses extending substantially perpendicularly between said upper and lower faces, said tightly wound multiple thicknesses of corrugated paperboard defining a multiplicity of load bearing beam members and adjacent shaped openings in the pallet body, said beam members being positioned to intersect those regions of the pallet body which in use are engaged by the forks of a fork lifting device during elevation of the pallet.

In the present specification, the term "corrugated board" includes any board product having a corrugated paper element, such as so-called single-face and double-face boards.

In one form of the invention, the pallet body is formed from a multiplicity of interconnected shaped elements formed from tightly wound corrugated board, each element having a central shaped opening and having portions defining the said load bearing beam members, each of which is positioned to substantially intersect said regions of support.

In the above form of the invention, the upper load supporting surface is covered by a top member having depending sides which serve to contain said shaped elements which are preferably adhesively secured to said top member, and preferably also adhesively secured to the sides and to each other.

The shaped elements are preferably formed from strips of single-face corrugated board which are tightly wound into a predetermined configuration with adjacent elements of the strips adhesively secured and then adhesively secured to the underside of the top member, and preferably to the sides and to each other.

Although the single-face corrugated board strips may be formed into any desired shape to provide the necessary support for a load engaging the top member in use, the presently preferred shape is generally triangular and the base member comprises at least two generally triangular shaped elements positioned to provide evenly distributed support for the load. Of course, the greater the number of generally triangular elements the more evenly distributed the load support would be. Thus, four generally triangular elements would provide better support for the load and would allow larger loads to be supported.

Pallets are usually not fully supported by the forks of a fork lift truck or the like, and the forks may extend of the order of 75% to 80% of the width of the pallet, leaving an unsupported edge portion which has a tendency to flex under load. The configuration of each shaped element is therefore such that the resultant pallet has a high resistance to bending or flexing, particularly in the principal region of the pallet. This is achieved in this preferred form by the use of the triangular element configurations the base portions of which define said beam members which extend diagonally from a central region towards each corner region of the pallet.

In one preferred configuration pairs of beam-like elements, which are preferably adhesively secured together, extend from the central region to each corner region of the pallet.

In a particularly preferred form of this embodiment the invention, the base member comprises eight generally triangular base elements arranged in pairs with their bases parallel and preferably adhesively secured, each pair of base elements being located in one quadrant of a generally rectangular top member. In this arrangement, the generally triangular elements are preferably isosceles triangular elements with the apex of the triangle truncated or flattened to allow the strips to be wound in this configuration on a former or mandrel and to more evenly spread loads applied to the pallet.

Fork access openings are preferably created by forming cut-outs in the edges of several of the base elements.

In an alternative form of this embodiment, elongate strips of single-face board are laminated together and are then transversely scored and folded to form connected pairs of said generally triangular elements, as will be described further below.

In another, presently most preferred, form of the invention, the pallet body is formed from at least one length of single-face corrugated board substantially continuously wound to define said multiplicity of load bearing beam members and adjacent shaped openings, said shaped openings being of limited transverse dimensions so as to provide an upper load supporting face, said limited dimensions being such as to enable a person taking care to stand on the upper load supporting face of the pallet.

By making the pallet from a single element of corrugated board, or a limited number of elongate connected elements, the labour content involved in manufacturing the pallet is significantly reduced since the only significant labour involved is in the positioning of formers for defining the shaped openings as the corrugated board is wound to define the pallet. This enables the resultant pallet to carry a load, and to be stood upon, without the need for a covering cap or flat top member, as is required in the case of the previously defined embodiment of the invention.

As in the case of the previously defined embodiment, the element(s) of corrugated board defining the pallet are tightly wound to define the load bearing beams and the adjacent shaped openings with the adjacent elements of corrugated board adhesively secured to each other to maintain the desired pallet configuration.

In a particularly preferred form of the invention, the openings comprise a central circular or square opening, a pair of opposed generally triangular openings, a pair of truncated triangular openings positioned at 90° to the triangular openings, a further pair of truncated triangular openings at about 45° to the preceding pair, a still further pair of truncated triangular openings at about 90° to the preceding pair, two pairs of truncated triangular openings at 45° to each opening of the preceding pair, and a peripheral element of multiple layers of corrugated board defining a generally square periphery of the pallet and having generally triangular openings at each corner.

Although it is possible to form fork access openings in the corrugated board elements, it is preferred to provide access openings by separately formed feet which are preferably made of wound corrugated board adhesively secured to the base of the pallet. If desired, the feet may be waxed at the edges which contact the floor or otherwise protected against moisture damage.

In another aspect, the invention provides a method of forming a pallet comprising winding multiple layers of a narrow strip of single-face corrugated board around formers defining openings of limited transverse dimensions positioned so as to define a pallet having an upper surface which is capable of supporting a load and on which a person is able to stand.

In a particularly preferred form of the invention, the openings comprise a central circular or square opening, a pair of opposed generally triangular openings, a pair of truncated triangular openings positioned at 90° to the triangular openings, a further pair of truncated triangular openings at about 45° to the preceding pair, a still further pair of truncated triangular openings at about 90° to the preceding pair, two pairs of truncated triangular openings at 45° to each opening of the preceding pair, and a peripheral element of multiple layers of corrugated board defining a generally square periphery of the pallet and having generally triangular openings at each corner.

BRIEF DESCRIPTION OF THE DRAWINGS

In order that the invention may be more readily understood, preferred embodiments will now be described with reference to the accompanying drawings in which.

DESCRIPTION OF PREFERRED EMBODIMENTS

Figure 1:
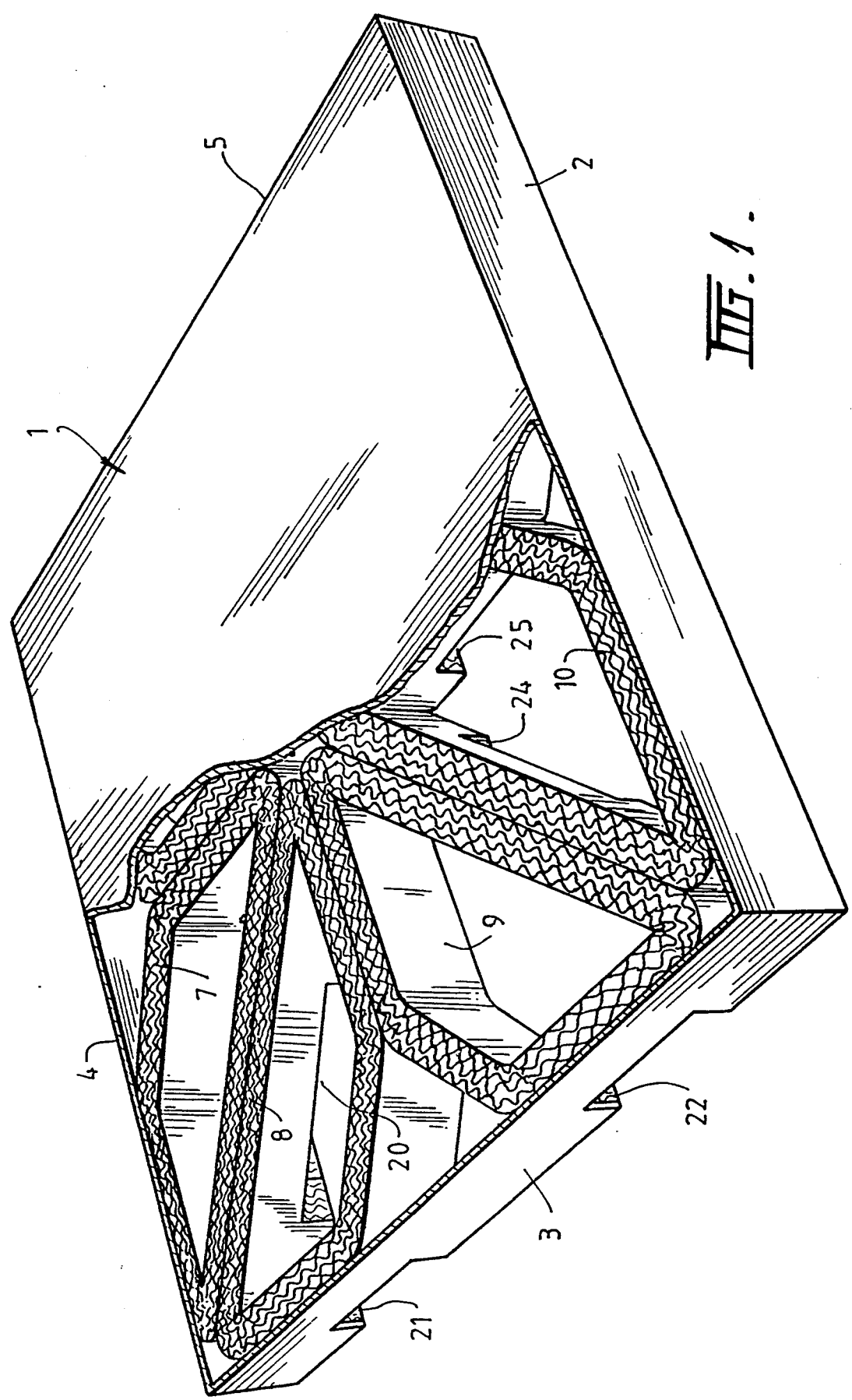
FIG. 1 is a perspective view from above of a pallet embodying the invention with part of the top removed to reveal structure.
Figure 2:
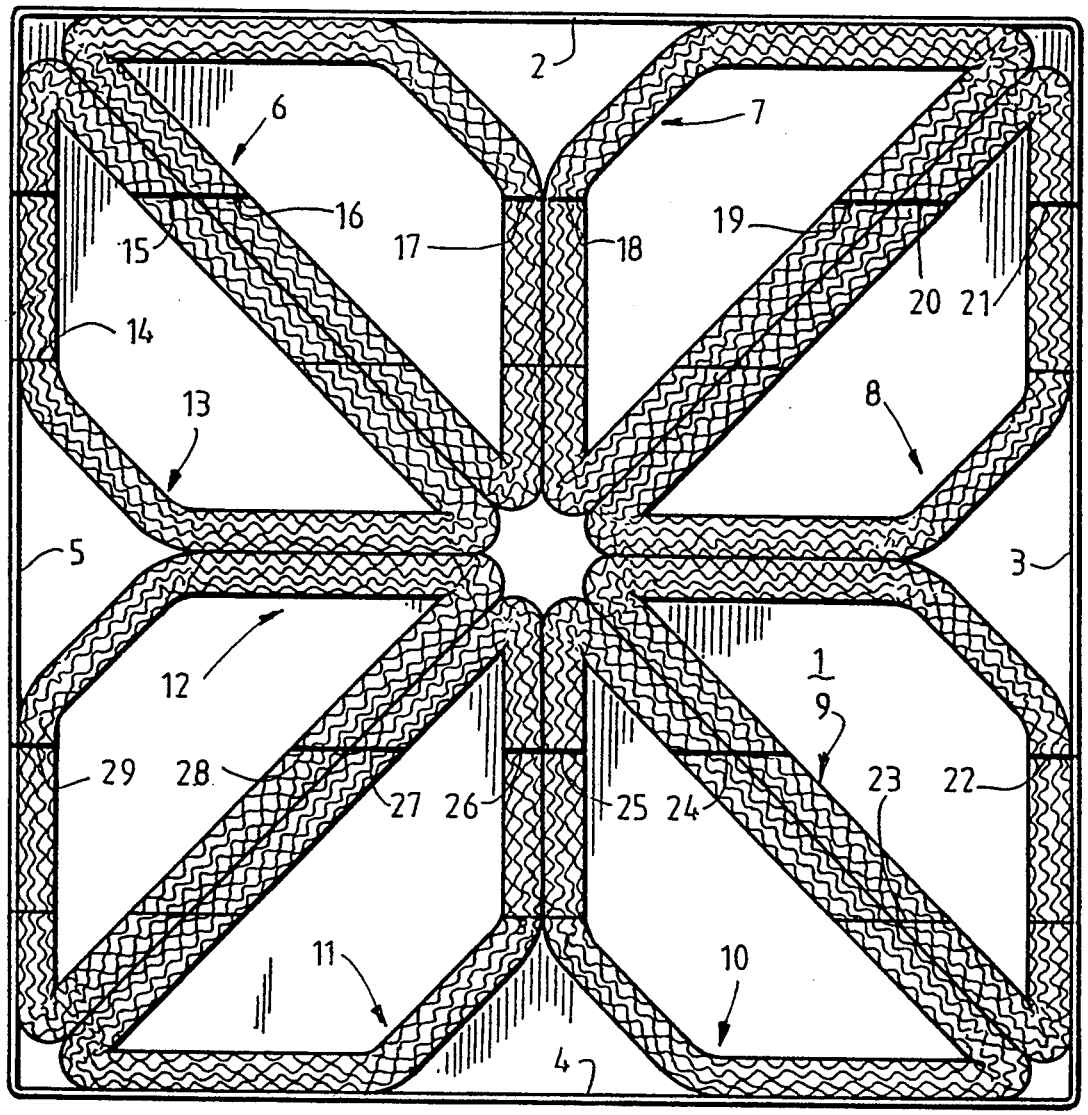
FIG. 2 is a plan view from beneath of the pallet of FIG. 1.
Figure 3:
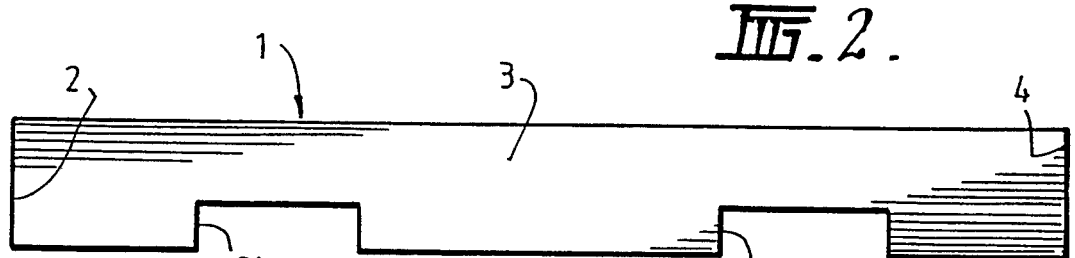
FIGS. 3 and 4 are side and end elevations of the pallet.
Figure 4:
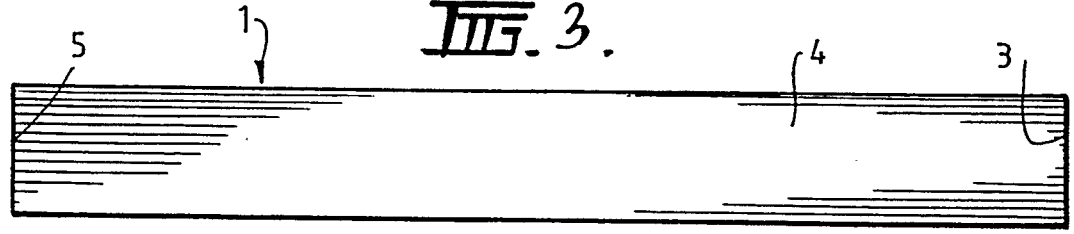

Referring firstly to FIGS. 1 to 4 of the drawings, the pallet comprises a top member formed from double-face corrugated board in a cap-like configuration including a top portion 1 and depending sides 2, 3, 4 and 5 (FIG. 2). To the lower face of the top portion 1 there is adhesively secured an array of base elements 6 to 13, defining a pallet body and each comprising a strip of single-face corrugated board tightly wound in a truncated isosceles triangular configuration with the corrugations of the single-face corrugated board extending perpendicular to the top portion 1 and with the base elements arranged in pairs with the bases of each pair in contact, as shown clearly in FIGS. 1 and 2. The adjacent portions of single-face board are adhesively secured and each element is adhesively secured to adjacent elements and to the sides 2 to 5 and the top 1 of the top member to create a stable coherent structure. If desired, at least the lower edges of the base elements 6 to 13 may be treated with a water-resistant material, such as paraffin wax, to reduce the likelihood of damage in wet environments.

The base elements 6 to 13 are formed with cut-out portions 14 to 29 to provide a pair of generally rectangular fork-access channels, in the lower faces of the base elements 6 to 13. While only one-way fork access is shown, two-way access may be provided by forming further cut-outs in the other direction.

Each base element comprises approximately five to ten layers of single-face corrugated board tightly wound in the configuration shown and this configuration and the arrangement of the array of elements on the underside of the top portion provides good support for loads of about 1 to 6 tonnes, depending on the number of layers of board used. For example, a pallet of the construction shown having eight layers of single-face will easily support a load of about 1 tonne, while a structure having 10 layers will support loads in the range 4 to 6 tonnes.

The pallet can be supported by the forks of a fork lift truck engaging the fork access cut-outs 14 to 28 in the base elements 6 to 13. Since most forks extend for only about 75% to 80% of the width of a standard pallet size, the configuration and arrangement of the base elements 6 to 13 within the top member must be such as to resist bending of the unsupported portion of the pallet. The arrangement shown in FIGS. 1 and 2 achieves the objective by virtue of the diagonally positioned bases of the triangular base elements 6 to 13 defining load supporting beam members which intersect the regions of support defined by the cut out points 14 to 29.

Figure 5:
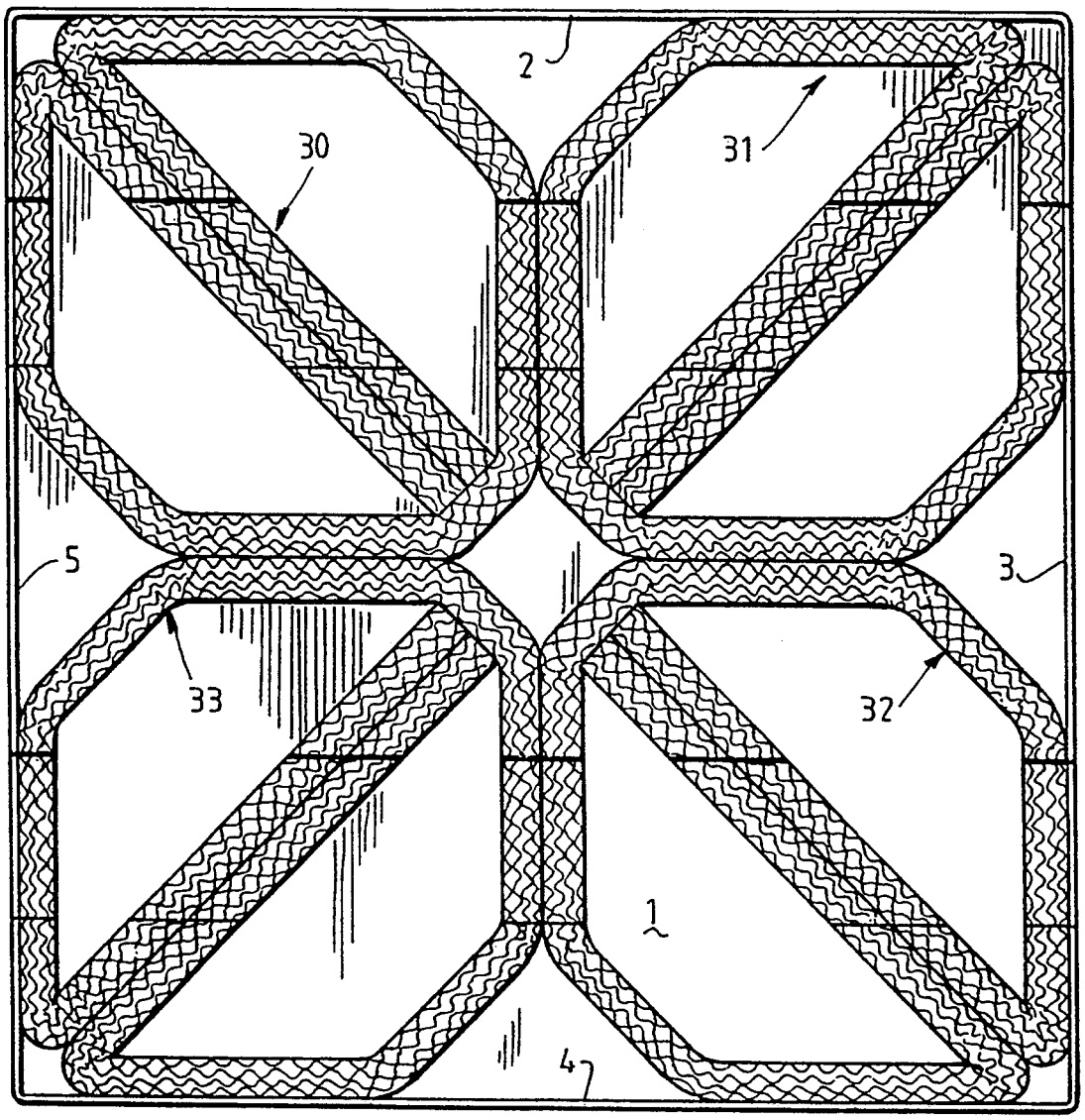
FIGS. 5 and 6 are plan views from beneath of two other pallets embodying the invention.

A base element configuration similar to that shown in FIGS. 1 and 2 may be achieved, as shown in FIG. 5 of the drawings, by laminating elongate elements of single-face and then transversely scoring and folding the elements at the positions shown to form connected pairs of flat-topped triangular elements 30 to 33 which are then adhesively secured in the configuration shown and then adhesively secured to the top member as before. This method of formation may be less labour intensive and may provide a slight increase in the strength of the base elements.

Figure 6:
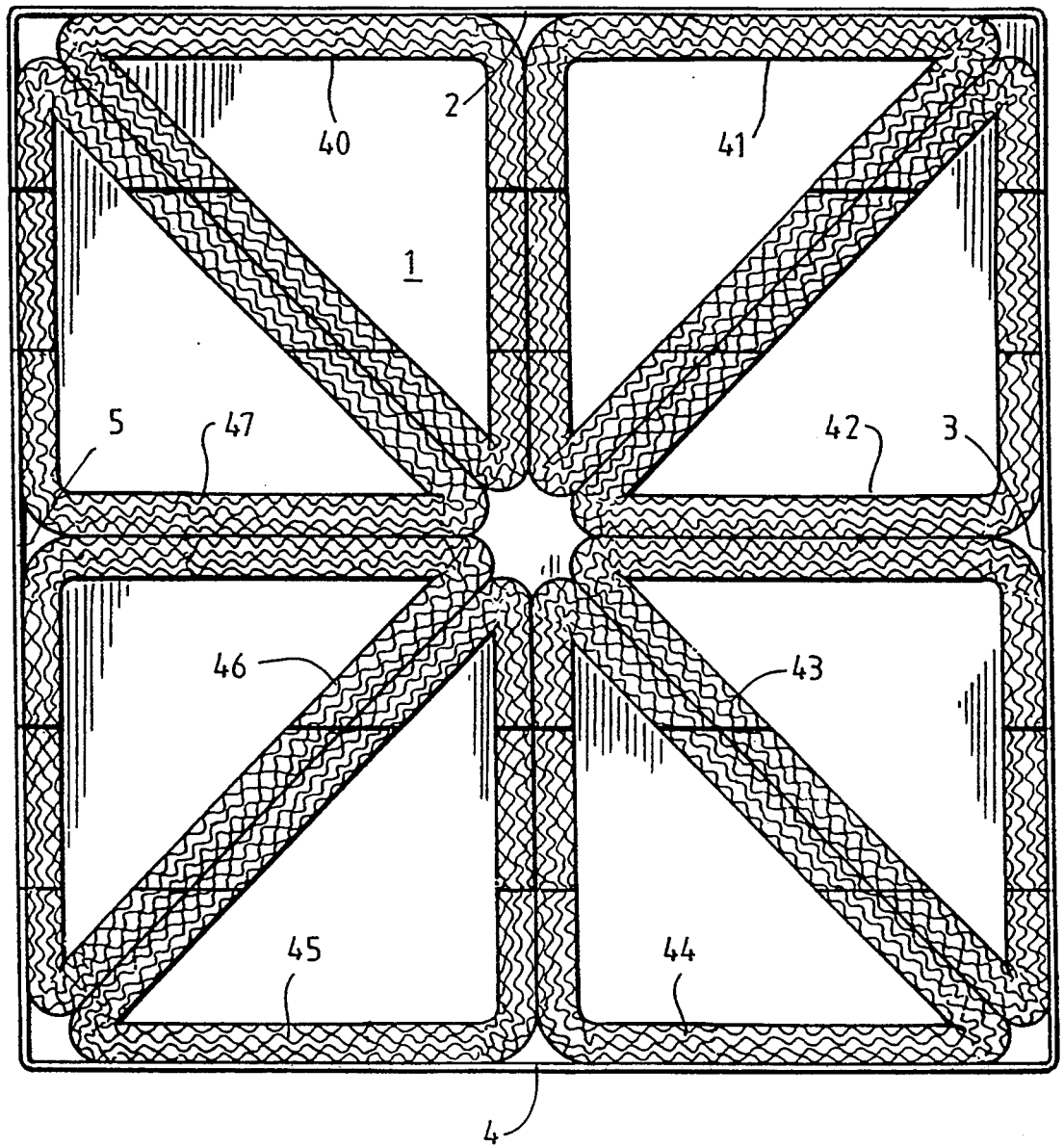

The embodiment of FIG. 6 of the drawings is similar to the embodiment of FIGS. 1 to 4, except that the base elements 40 to 47 are of isosceles triangular configuration, rather than truncated isosceles triangular configuration. The construction of this pallet is otherwise identical to the pallet of FIGS. 1 to 4.

Figure 7:
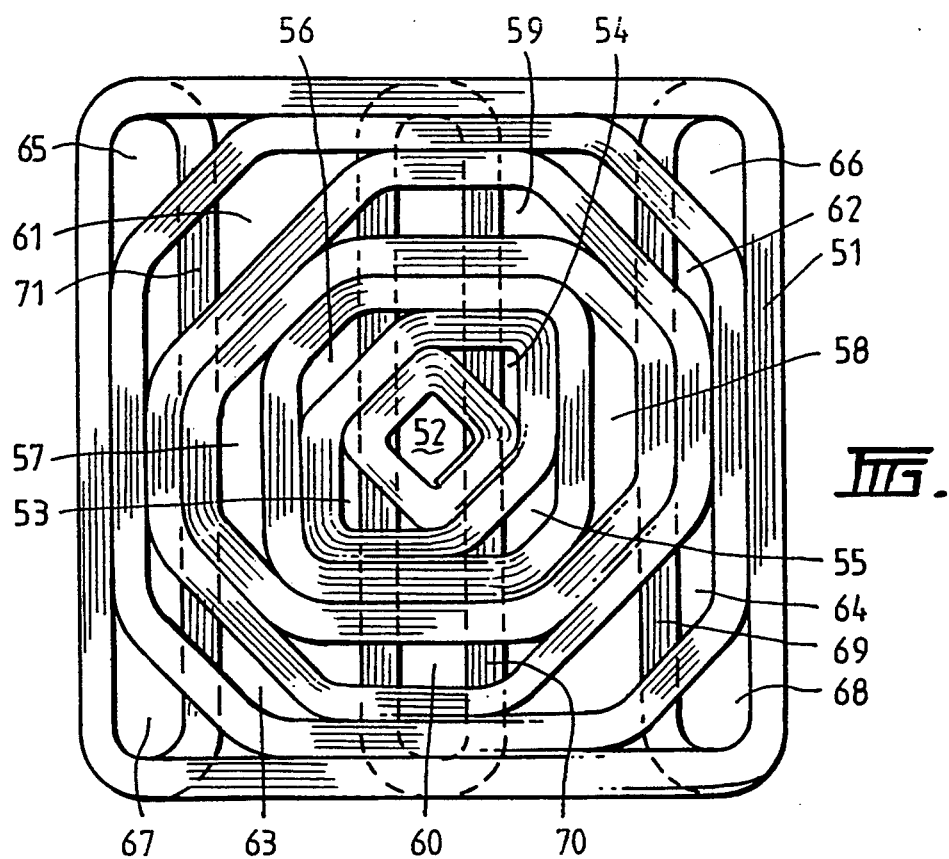
FIG. 7 is a plan view of a further, presently most preferred, pallet embodying the invention.
Figure 8:
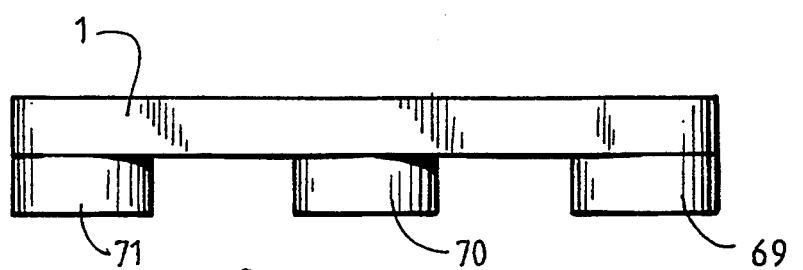
FIG. 8 is a side elevation of the pallet of FIG. 7 showing the positioning of the support feet of the pallet, and new line
Figure 9:
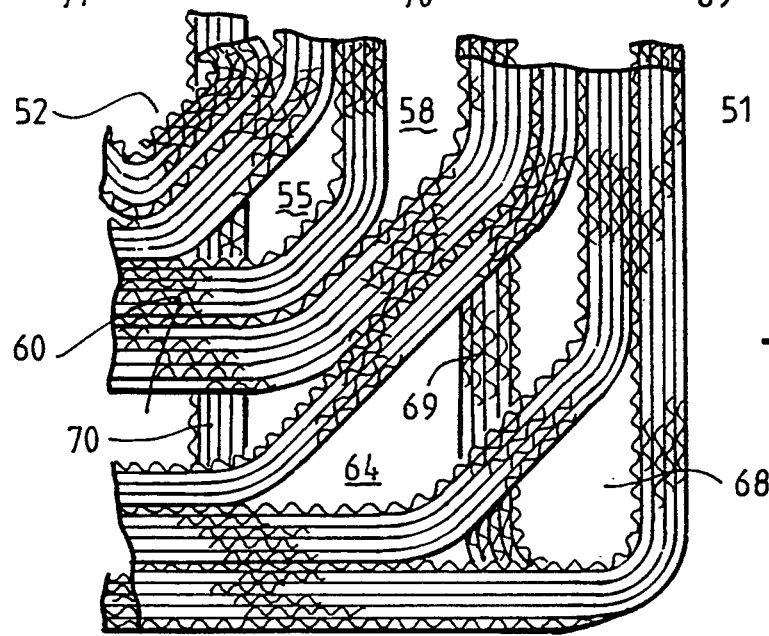
FIG. 9 is an enlarged fragmentary plan view showing the manner in which the corrugated board is wound to define the pallet configuration shown in FIG. 7.

In most preferred embodiment, shown in FIGS. 7 to 9 there are 5 to 10 layers of A-flute single face corrugated board, although it will be appreciated that a single-face board having smaller or larger corrugations may be used, including corrugations as large as 8 to 10 mm. The adjacent layers of corrugated board are adhesively secured by means of any suitable packaging grade adhesive to maintain the configuration shown in FIG. 7.

The presently preferred configuration for the pallet, as shown in FIG. 7, includes a continuous length of single-face corrugated board wound in multiple layers to define a continuous supporting element 51 defining a central square opening 52, which may alternatively be round, a pair of opposed generally triangular openings 53, 54, a pair of opposed truncated triangular openings 55, 56 at 90° to the triangular openings 53, 54, a further pair of larger truncated triangular openings 57, 58, located at 45° to the preceding pair, a further pair of slightly larger truncated triangular openings 59, 60 at 90° to the preceding pair, two further opposed pairs of larger truncated triangular openings 61, 62, 63, 64 at 45° to each of the preceding openings 59, 60, and triangular openings 65, 66, 67 and 68 at the corners of the pallet defined by the square peripheral element 51 of wound single-face corrugated board.

Although the above configuration is presently preferred, it will be appreciated that other configurations may be adopted to achieve a similar result: providing a supporting pallet which is able to be stood upon and which will support the required loads without the need for an enclosing cap, as is provided in the preferred embodiments described above.

Formation of triangular and truncated triangular openings in the pallet is present for the purpose of generating a final pallet shape which is substantially square, and for providing cross beam members which are at an angle, in the present formation, preferably 45°, to the principal direction of support by the lifting forks between the feet described below. These beam members provide the resistance to bending of the pallet when the pallet is lifted by forks carrying a load. The arrangement of openings reduces the amount of corrugated board used to form the pallet while ensuring that the resistance to bending of the pallet will be satisfactorily met by the beam members.

The pallet is provided with three elongate generally rectangular feet 69, 70 and 71, which preferably comprise wound single-face corrugated board defining an open rectangular loop of the configuration shown in FIGS. 7 and 9. If desired, the edges of the feet which are to contact a support surface may be treated to prevent damage by moisture. For example, the edges may be dipped in water-proofing wax or may have thin particle board (eg. Masonite (Registered Trade Mark)) laminated to their lower most faces. The provision of separate feet which are adhesively secured to the lower face of the pallet is a preferred method of providing fork access for the pallet since the provision of slots in the edges of the corrugated board elements, of the type described above has the disadvantage of weakening the structural integrity of the pallet.

The described arrangement of openings in a pallet have about eight layers of board is such that a load of the order of 1 tonne may be supported by the pallet, even with as much as 20 to 25% of the pallet unsupported by the lifting forks, without significant flexing of the pallet. In this regard, the positioning of the feet as shown in FIG. 2 of the drawings maximizes the strength of the pallet and reduces flexing during lifting by a fork lift. If desired, a cap similar to that used in the above embodiments may be used for cosmetic purposes, although the use of such a cap would increase the production cost of the pallet.

The pallet according to this embodiment of the invention has a generally square outer periphery defined by multiple layers of single-face corrugated board tightly wound from a central starting position around a number of formers of different shapes to define the openings visible in FIGS. 1 and 2. The continuous multi-layered element which defines the openings also defines load carrying elements which radiate in a generally spiral manner from the central opening to the periphery referred to above.

The use of a single length of corrugated board wound into the configuration described above not only reduces the labour content of the product but also increases its structural integrity. It will be appreciated that while it is preferred to use a single length of board, similar results can be obtained by using limited numbers of relatively long strips of board secured together or overlapped with each other.

Since the pallets described above are made entirely from corrugated board, they are lightweight in construction (4 to 5 kg compared with 40 to 50 kg for wood), significantly less expensive than one-way wooden pallets, and can be disposed of for recycling after it has been used. The pallet has high compressive strength and is able to withstand loads of the order of 1 to 6 tonnes in the configurations shown. The pallet flexes only minimally when lifted or when it is supported on an irregular surface and does not present any nails or splinters to the user or to the goods supported thereon. Furthermore, since it is light in weight, it significantly reduces the risk of injury during handling.

The cost of each pallet is significantly less than the cost of a wooden pallet so that it may be more readily disposed of after each use. The pallet may be made from recycled paper and further savings are possible by making the base elements from off-cut paper. The pallet is able to be recycled after use to significantly reduce environmental impacts.

While the base element configuration described above are preferred for their load supporting capacity and material efficiency, many other configurations may be used with equally acceptable results. For example, if only light loads are to be supported an array of two to four triangular elements or two to four generally rectangular elements may be secured to the top member, or an array of generally rectangular elements of increasingly smaller dimensions may be positioned from the periphery of the pallet inwardly towards the centre. Alternatively, a regular array of nine or more cylindrical or annular elements may be used. If desired, the top member may be made from some material other than corrugated board, although corrugated board is preferred from a practical and economic point of view.

We claim:

1. A pallet, comprising:
   a pallet body having an upper load supporting face and a lower face, said pallet body being formed from corrugated paperboard tightly wound in multiple layers with the corrugations of each layer extending substantially perpendicularly between said upper and lower faces, said tightly wound multiple layers of corrugated paperboard defining a multiplicity of load bearing beam members and adjacent shaped openings in the pallet body with side walls of each beam member being in contact with side walls of an adjacent beam member at points of contact and secured thereto at such points of contact;
   means on said lower face of said pallet body for defining regions of support configured for engagement by forks of a fork lifting device, whereby said beam members are engaged by said forks during elevation of the pallet; and
   leg means on said lower face of said pallet body offset from the means defining regions of support defining legs for supporting the pallet body.

2. The pallet of claim 1, wherein the body is formed from a multiplicity of interconnected shaped elements formed from tightly wound corrugated paperboard, each element having a central shaped opening and having portions defining said load bearing members, and each element is positioned to substantially intersect said regions of support.

3. The pallet of claim 2 wherein the upper load supporting face is covered by a top member having depending sides which serve to contain the shaped elements, the shaped elements being adhesively secured to the top member, to the sides and to each other.

4. The pallet of claim 2, wherein each shaped element is of generally triangular configuration and the pallet body comprises at least two of said triangular shaped elements with the bases of the triangular shaped elements defining said beam members and positioned to intersect the regions of support of the pallet.

5. The pallet of claim 4, wherein said body comprises eight similar generally triangular base elements positioned in pairs with the bases of the triangular elements contacting each other and the sides of adjacent pairs of the triangular elements similarly contacting each other.

6. The pallet of claim 5, wherein each triangular element has a substantially flattened apex.

7. The pallet of claim 6, wherein each pair of generally triangular base elements is formed from elongate elements of single-face corrugated board laminated to each other and then transversely scored and folded to form connected pairs of generally triangular elements.

8. The pallet of claim 1, wherein said body is formed from lengths of single-face corrugated board substantially continuously wound to define said multiplicity of load bearing beam members and adjacent shaped openings.

9. The pallet of claim 8, wherein said shaped openings are of limited transverse dimensions so as to provide said upper load supporting face on which a person taking care can stand.

10. The pallet of claim 9, wherein said body is formed from continuous lengths of single-face corrugated paperboard.

11. The pallet of claim 1, wherein said body is formed from continuous lengths of single-face corrugated paperboard.

12. The pallet of claim 8 or 11 further comprising feet members secured to the lower face of the pallet body to define the regions of support of the pallet accessible to the forks of a fork lift device.

13. The pallet of claim 12 further comprising feet members secured to the lower face of the pallet body to define the regions of support of the pallet accessible to the forks of a fork lift device.

14. The pallet of claim 8 further comprising feet members secured to the lower face of the pallet body to define the regions of support of the pallet accessible to the forks of a fork lift device.

15. The pallet of claim 14, wherein said feet members comprise elongate generally rectangular elements formed from tightly wound lengths of corrugated board adhesively secured to the lower face of the pallet body.

16. The pallet of claim 15, wherein exposed lower most surfaces of the feet are protected against moisture damage.

17. The pallet of claim 1, wherein the upper load supporting face is free of a covering layer, and the lower face of the pallet body is directly secured to the leg means.

18. A pallet, comprising:
    a pallet body having an upper load supporting face and a lower face, said pallet body being formed from corrugated paperboard tightly wound in multiple layers, the corrugations of each layer extending substantially perpendicularly between said upper and lower faces, said tightly wound multiple layers of corrugated paperboard defining a multiplicity of load bearing beam members and adjacent shaped openings in the pallet body with side walls of each beam member being in contact with side walls of an adjacent beam member at points of contact and secured thereto at such points of contact; and
    feet made of tightly-wound corrugated paperboard secured to said lower face of said pallet body for supporting said pallet, and
    a pair of parallel slots which open along a side of the pallet body and are configured for engagement by forks of a fork lifting device.

19. The pallet of claim 18, wherein the slots comprise spaces between the feet.

20. The pallet of claim 18, wherein the slots comprise cut-away portions on the lower face of the pallet body, and the feet comprise portions of the lower face of the pallet body adjacent the slots.

21. The pallet of claim 18, wherein each beam member comprises an endless length of corrugated paperboard, and said beam members are nested one inside another such that one beam member is disposed inside another with an outer peripheral side wall of one beam member being adhesively secured to an inner peripheral side wall of an adjoining beam member inside of it.

22. The pallet of claim 18, wherein the upper load supporting face is free of a covering layer, and the lower face of the pallet body is directly secured to the legs.

* * * * *